United States Patent [19]

Karlberg

[11] 4,354,657
[45] Oct. 19, 1982

[54] SUPPORTS FOR COAXIAL CONDUITS

[76] Inventor: John E. Karlberg, c/o J. Karlberg Associates, P.O. Box 58, Wycombe, Pa. 18980

[21] Appl. No.: 220,839

[22] Filed: Dec. 29, 1980

[51] Int. Cl.³ .................. B28B 7/16; B29C 1/00
[52] U.S. Cl. ........................ 249/83; 52/727; 138/106; 138/113; 138/114; 248/56; 248/65; 249/39; 285/133 R
[58] Field of Search .......... 425/63, DIG. 14, 417; 249/83, 84, 85, 88, 96, 148, 149, 87, 91, 93, 94, 96, 97, 142, 144, 175–177, 151, 17, 22, 38; 264/262, 267, 33, 35; 405/146, 150; 242/72 R, 72.1, 72; 279/1 F; 248/56, 49, 65; 254/104; 269/48.1; 138/112, 113, 114, 103–106; 174/99 R, 99 B

[56] References Cited

U.S. PATENT DOCUMENTS

| | | | |
|---|---|---|---|
| 567,658 | 9/1896 | Rose | 269/48.1 |
| 833,481 | 10/1906 | Paugh | 242/72.1 |
| 959,167 | 5/1910 | Rice | 425/63 |
| 1,016,738 | 2/1912 | Curry | 242/72.1 |
| 1,452,751 | 4/1923 | Nelson | 249/22 |
| 1,534,868 | 4/1925 | Roney | 242/72.1 |
| 1,547,221 | 7/1925 | Lehrack | 249/22 |
| 1,627,729 | 5/1927 | Dingee | 242/72.1 |
| 2,460,323 | 2/1949 | Whitson et al. | 242/72.1 |
| 2,598,398 | 5/1952 | Littell et al. | 242/72.1 |
| 2,682,924 | 7/1954 | Lomazzo | 242/72 |
| 2,711,862 | 6/1955 | Herr | 242/72 |
| 3,330,021 | 7/1967 | Jacobsen | 269/48.1 |
| 3,456,893 | 7/1969 | Michelson | 242/72.1 |
| 3,489,363 | 1/1970 | Diolot | 242/72.1 |
| 3,490,496 | 1/1970 | Stearns | 138/112 |
| 3,564,108 | 2/1971 | Schmitz | 174/99 R |
| 3,645,465 | 2/1972 | Perry | 242/72.1 |
| 3,743,854 | 7/1973 | Bell et al. | 174/99 R |
| 3,992,169 | 11/1976 | Loudon | 62/55 |
| 4,142,690 | 3/1979 | Karle et al. | 242/72.1 |

FOREIGN PATENT DOCUMENTS

| | | | |
|---|---|---|---|
| 729886 | 12/1942 | Fed. Rep. of Germany | 242/72.1 |
| 2211685 | 9/1973 | Fed. Rep. of Germany | 242/72.1 |

Primary Examiner—Willard E. Hoag
Attorney, Agent, or Firm—Z. T. Wobensmith, 2nd; Z. T. Wobensmith, III

[57] ABSTRACT

Supports for coaxial conduits are disclosed particularly suitable for supporting, on an inner nozzle or conduit protruding from an existing reactor wall, a nozzle sleeve which is to be held in concentric relation to the inner nozzle so that concrete may be poured in surrounding relation to the nozzle sleeve, the supports comprising wedging units adjustable from the outer ends and radius bars holding upper wedging units in place while the nozzle sleeve is moved into place.

9 Claims, 5 Drawing Figures

SUPPORTS FOR COAXIAL CONDUITS

BACKGROUND OF THE INVENTION

1. Field of the Invention

This invention relates to supports for coaxial conduits and in which an inner nozzle or conduit has a nozzle sleeve clamped thereon by adjustable wedges.

2. Description of the Prior Art

Various expedients have heretofore been employed for clamping concentric conduits in spaced relation.

Loudon, in U.S. Pat. No. 3,992,169, shows inner and outer tubes held in spaced relation to provide a space therebetween for a vacuum and in FIGS. 8 and 9 outer and inner metallic rings 123 and 125 are shown which carry fiberglass spokes 129.

Stearns, in U.S. Pat. No. 3,490,496, shows coaxial tubing with helical ribbons providing spacer means.

The foregoing spacers are not readily removable, and are not adjustable to accommodate different sizes of conduits.

SUMMARY OF THE INVENTION

In accordance with the invention a support for coaxial conduits is shown, particularly suitable for supporting, on an inner nozzle or conduit protruding from an existing reactor wall, a nozzle sleeve which is to be held in concentric relation to the inner nozzle so that concrete may be poured in surrounding relation to the nozzle sleeve, the supports or spacers comprising wedging units adjustable from the outer ends with radius bars holding upper wedging units in place for placing of the nozzle sleeve.

It is the principal object of the invention to provide supports for a nozzle sleeve carried on an inner nozzle which can be readily applied and removed as desired.

It is a further object of the invention to provide supports for a concentric and coaxial nozzle sleeve with respect to an inner fixedly mounted nozzle which are simple and sturdy in construction.

It is a further object of the invention to provide supports for an outer nozzle sleeve with respect to an inner fixedly mounted nozzle which have adequate strength for the application therearound of concrete for anchoring the nozzle sleeve in position.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a reactor wall 10, of masonry or the like, is shown from which a nozzle 11 extends. A nozzle sleeve 12 is provided which is to be held coaxially with respect to the nozzle 11 and preferably concentrically.

Supports 15 are employed, one of which is disposed at the bottom between the nozzle sleeve 12 and the nozzle 11, other supports 15 preferably being disposed at an angle of the order of 120° from the bottom support. The supports 15 are preferably of a length less than the length of the nozzle sleeve 12. Additional supports 15, dependent on the respective diameters of the nozzle 11 and the nozzle sleeve 12 may be employed.

Figure 1:
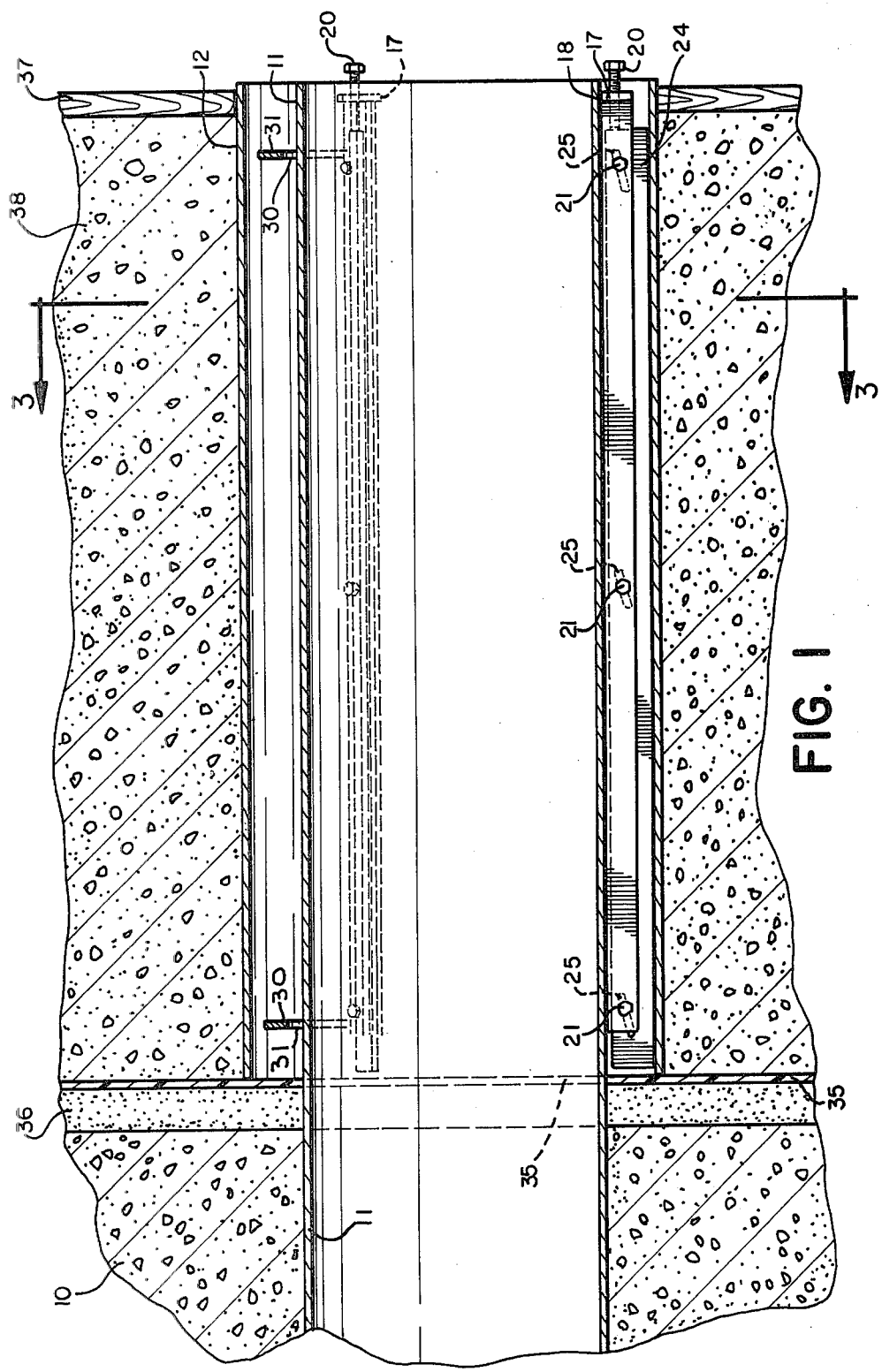
FIG. 1 is a vertical longitudinal sectional view of a nozzle and nozzle sleeve with the supports shown in position and taken approximately on the line 1—1 of FIG. 2.
Figure 2:
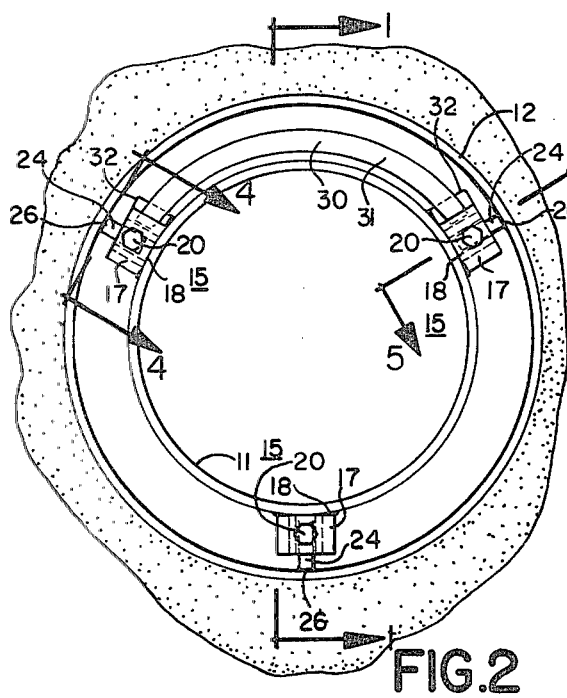
FIG. 2 is an end elevational view as seen from the right of FIG. 1.
Figure 3:
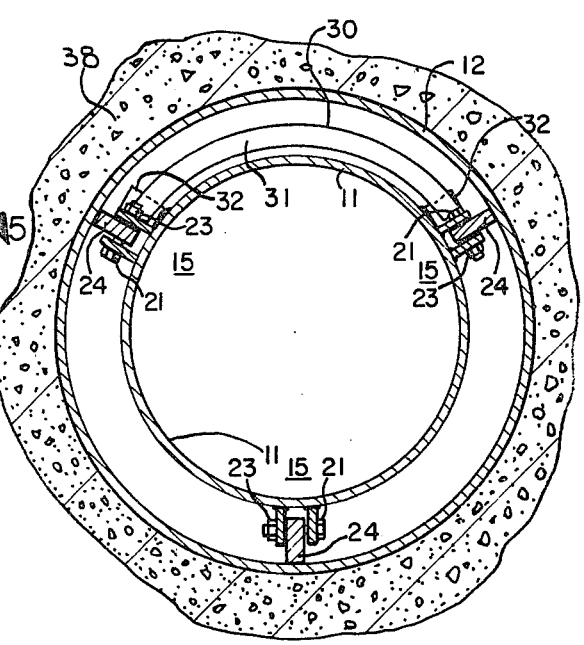
FIG. 3 is a vertical sectional view taken approximately on the line 3—3 of FIG. 1.
Figure 4:
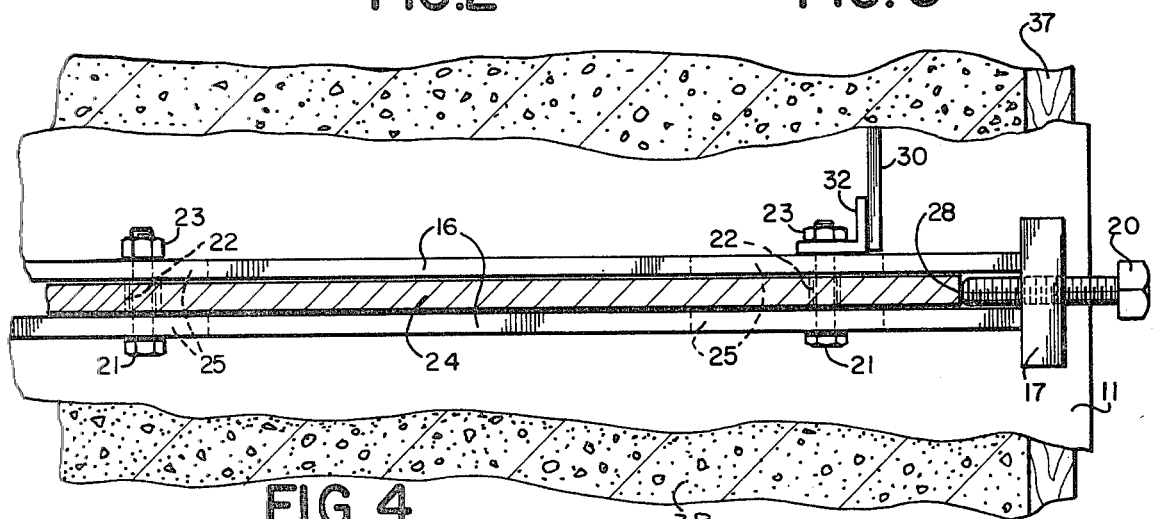
FIG. 4 is a fragmentary sectional view, enlarged, taken approximately on the line 4—4 of FIG. 2.
Figure 5:
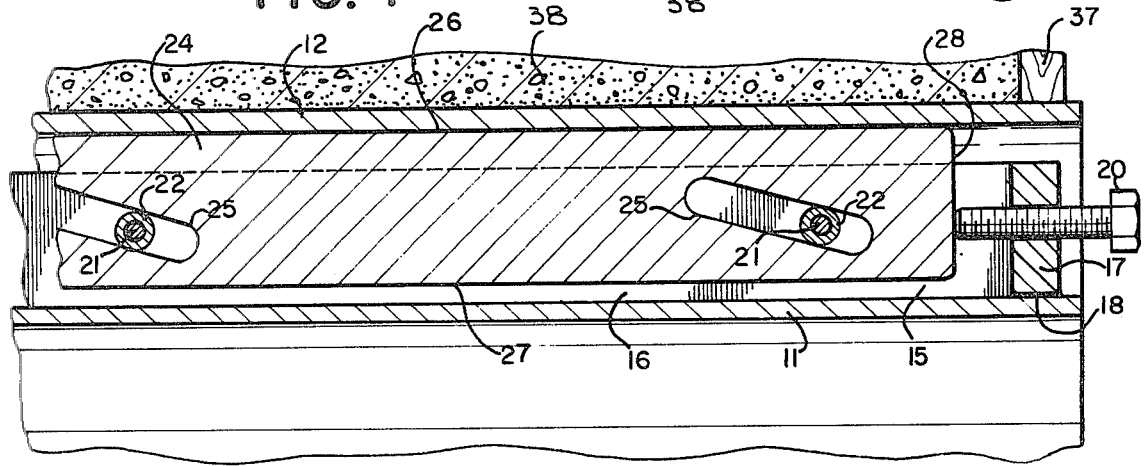
FIG. 5 is a fragmentary sectional view, enlarged, taken approximately on the line 5—5 of FIG. 2.

Each of the supports 15, as shown more in detail in FIGS. 4 and 5, comprises a pair of spaced parallel bars 16, rectangular in cross section and secured to a positioning head 17 at the outer end. The head 17 is preferably rectangular, and has a lower or inner edge 18.

The bars 16 have a plurality of bolts 21 extending therethrough with collars 22 on the bolts 21 and retaining nuts 23.

A movable bar 24 is provided, having a plurality of inclined slots 25 for raising and lowering the bars 24, an outer edge 26 to engage the sleeve 12, inner edge 27 and an end edge 28 for engagement by the adjusting bolt 20 to position the bar 24.

A radius bar 30 is provided having an arcuate portion 31, with a bracket 32 secured thereto at each end, the brackets 32 being carried on the outermost and innermost of the bolts 21.

The mode of use will now be explained.

Assume that the nozzle 11 is secured in place in the reactor wall 10.

The upper supports 15, in partially retracted position, and with the radius bars 30 secured by the brackets 32 on the innermost and outermost bolts 21 can be moved into position above the nozzle 11 prior to insertion of the lowermost support 15. The lowermost support 15, in partially retracted postition, can then be moved into place to support and position the nozzle sleeve 12 at the bottom. The movable bars 24 can then be advanced outwardly with their edges 26 in clamping engagement with the nozzle sleeve 12 by turning of the adjusting bolts 20 and preferably with the sleeve 12 concentric with the nozzle 11.

A fiberglass wall 35 can be applied after the sleeve 12 is in place and the void 36 filled with sand. An outside concrete form 37 can be applied at the outer end of the nozzle sleeve 12 and anchored in place.

With the nozzle sleeve 12 retained in position the space between the form 37 and the wall 35 is then filled with concrete as at 38 and the concrete permitted to harden and cure. The form 37 is removed and the sand in the void 36 is blown out with air.

The adjusting bolts 20 are turned from their clamping positions and the supports 15, including the lowermost support 15 and the supports 15 which are connected by the radius bar 30 are removed.

The structure is then ready for use.

I claim:

1. Apparatus for supporting an exteriorly disposed sleeve member in a fixed interiorly disposed hollow cylindrical member which comprises a plurality of axially disposed longitudinally extending support bars for engagement with one of said cylindrical members, a plurality of interposed bars each cooperating with a pair of said support bars so as to be movable radially with respect to one of said cylindrical members to adjust the spacing of said cylindrical members, said support bars and said interposed bars being disposed at at least three radial locations relative one said cylindrical member for adjusting the spacing of said cylindrical members, and members exteriorly accessible at the ends of said support bars for separately adjusting said support bars and said interposed bar.

2. Apparatus as defined in claim 1 in which
said interposed bars have inclined slots,
said support bars have bolts extending therethrough and through said slots, and
said head portions have adjusting bolts engaging end portions of said interposed bars for positioning said interposed bars.

3. Apparatus as defined in claim 1 in which
said support bars are distributed at a plurality of locations between said members, and
pairs of said supports bars having a connecting bar extending therebetween.

4. Apparatus as defined in claim 1 in which
one pair of said support bars have a connecting bars therebetween.

5. Apparatus as defined in claim 1 in which
spaced walls are provided at the ends of said cylindrical sleeve member, and
concrete is provided around said cylindrical sleeve member and between said spaced walls.

6. Apparatus as defined in claim 1 in which
pairs of said support bars have connecting head portions, and
said members for adjusting said interposed bars are mounted in said head portions.

7. Apparatus as defined in claim 1 in which
said interposed bars have inclined slots,
said axially disposed bars have bolts extending therethrough and through said slots,
said support bars are distributed at a plurality of locations between said members,
pairs of said support bars having a connecting bar extending therebetween, and
said connecting bar has portions carried on said bolts.

8. A cylindrical sleeve member and means for supporting said member in a hollow cylindrical member, comprising;

a plurality of pairs of support bars longitudinally extending between said cylinders, a plurality of interposed bars each cooperating with a pair of said support bars so as to be slidably movable radially with respect to one of said cylindrical members, Said support bars and said interposed bars being disposed at at least three radial locations relative one of said cylindrical members spacing of said cylindrical members, said members exteriorly accessible to the ends of said support bars for separately adjusting said support bars and said interposed bar.

9. Apparatus as defined in claim 8 in which
said bolts have collars thereon between said disposed bars.

* * * * *